United States Patent
Pittner

[11] 3,735,226
[45] May 22, 1973

[54] CONSTANT TORQUE AND INERTIA CONTROL FOR ARMATURE CURRENT REGULATED DC MOTOR WITH FIELD WEAKENING

[75] Inventor: John R. Pittner, Pittsburgh, Pa.

[73] Assignee: Westinghouse Electric Corporation, Pittsburgh, Pa.

[22] Filed: Feb. 4, 1972

[21] Appl. No.: 223,638

[52] U.S. Cl..................................318/338, 318/432

[51] Int. Cl................................................H02p 7/14

[58] Field of Search......................318/144, 145, 331, 318/338, 393, 405, 432, 434

[56] References Cited
UNITED STATES PATENTS

| | | | |
|---|---|---|---|
| 3,309,597 | 3/1967 | Gabor et al. | 318/393 |
| 3,197,688 | 7/1965 | Horner, Jr. | 318/338 |
| 3,026,464 | 3/1962 | Greening et al. | 318/338 X |

Primary Examiner—Bernard A. Gilheany
Assistant Examiner—W. E. Duncanson, Jr.
Attorney—F. H. Henson et al.

[57] ABSTRACT

Constant and acceleration torque (inertia) compensating signals are combined with armature current feedback to develop a current control signal for regulating the armature current of a direct current motor so that output torque both is kept constant for and weakened motor shunt fields, and during system speed changes.

9 Claims, 3 Drawing Figures

W < RATED VALUE FC CONSTANT TC & TM = f(CEMF)
W < RATED VALUE CEMF CONSTANT TC & TM = f(W)

CONSTANT TORQUE AND INERTIA CONTROL FOR ARMATURE CURRENT REGULATED DC MOTOR WITH FIELD WEAKENING

BACKGROUND OF THE INVENTION

In a prior art direct current motor control system such as is shown in U.S. Pat. No. 3,590,350 (assigned to the present Assignee) motor field and armature current controls are provided employing current feedback for power regulation. If field weakening is used in a system of this type, the motor field control establishes constant field current (FC) when the motor counter-electromotive force (CEMF) is below rated value and changes to a constant CEMF regulation control when the motor CEMF reaches rated value, and motor speed reaches crossover value. The regulation function thus has two states considered herein as: FC/CEMF to signify that as the motor speed reaches crossover value there is a "crossover" from field current (FC) regulation to CEMF regulation.

It has been found that when the crossover occurs, the requirements for maintaining constant output torque change and that, consequently, the prior art control system does not provide the proper compensation for motor torque as is necessary to provide drive output torque which is constant as motor shunt field weakens and/or as system speed changes.

SUMMARY OF THE INVENTION

The present invention provides what is referred to herein as a Crossover Reference Circuit which produces a signal referred to as E/W which has a constant value when the motor speed is below crossover value and automatically switches to a signal proportional to motor speed W when the FC/CEMF crossover occurs. Reference signal E/W is utilized to develop a constant torque reference signal (TC) and is also combined in a circuit referred to as an Inertial Compensation Signal Generator with a representation of accelerating torque required to produce an accelerating torque reference TM.

Armature current feedback is then combined with the constant torque and accelerating torque references to produce a current control signal to control the regulation of the motor armature current so that output torque is kept constant as motor field weakens and/or as system speed changes.

The above and other objects and features of the invention will become apparent from the following detailed description taken in connection with the accompanying drawings which form a part of this specification, and in which.

Figure 1:
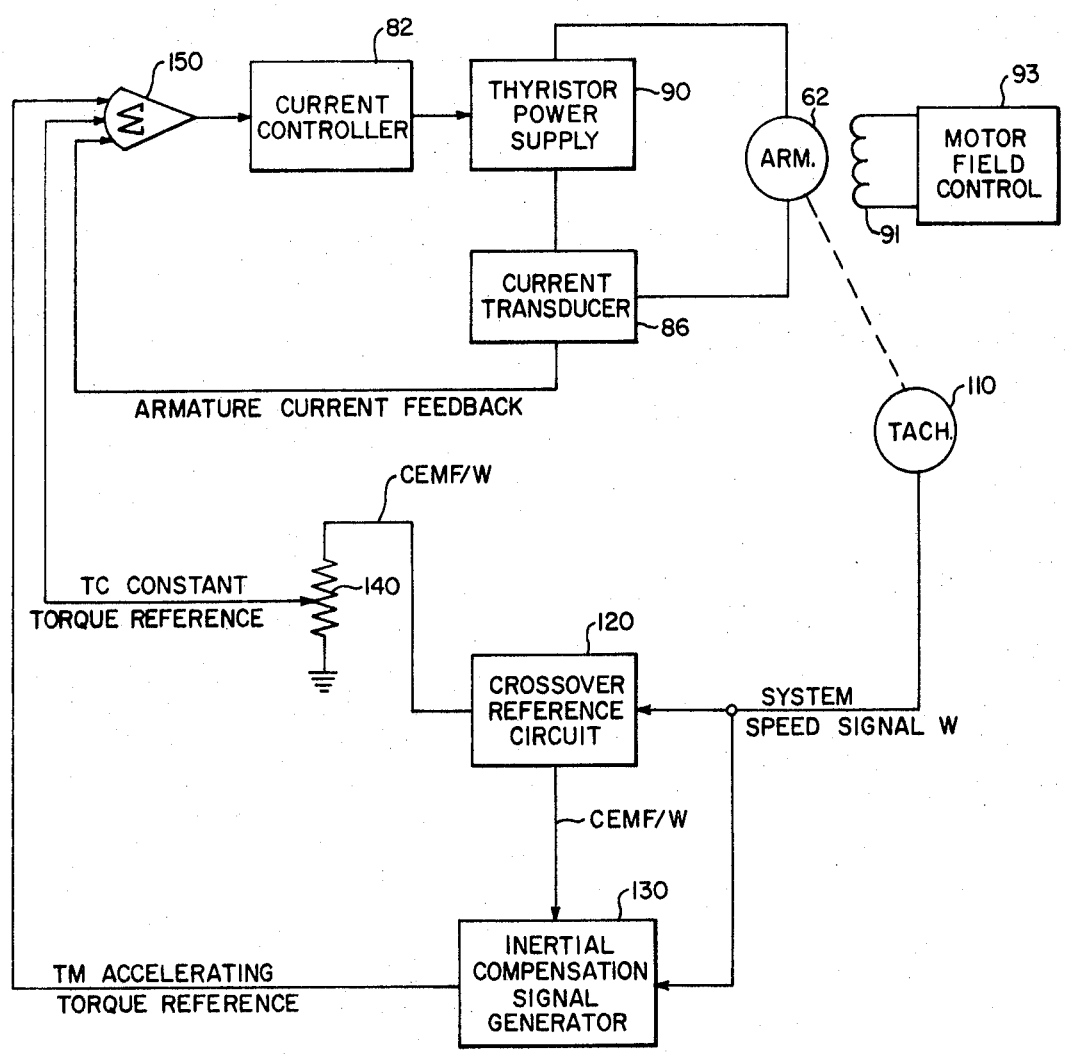
FIG. 1 is a block diagram of a system employing the invention.

Referring now to FIG. 1, it will be noted that the armature current of an armature 62 is provided by means of a thyristor power supply 90 and is sensed by means of a current transducer 86 to provide a feedback signal applied to a summing amplifier 150 provided by the invention. The field winding 91 of the motor receives its energy through a motor field control 93. It will be noted that reference numbers 62, 82, 86, 90, and 93 are the same as those which are used in prior art U.S. Pat. No. 3,590,350 mentioned above. The improved features provided by the invention are all referenced with numbers over 100.

Motor speed is translated into a suitable speed signal W by means of a tachometer 110. Speed signal W is sensed in crossover circuit 120 which produces a constant reference signal for speeds below crossover value and a signal proportional to speed W for speeds equal to or greater than crossover value. The constant torque reference signal TC is developed from signal E/W through a potentiometer 140 and is, therefore, directly proportional to the crossover signal reference. In the case of inertial compensation or changing torque reference (acceleration or deceleration), the desired relationship has been found to be proportional to the product of the crossover reference signal, the derivative of speed signal W, and the moment of inertia (J).

Below rated CEMF, motor field current is kept constant by control 93. Hence, the constant torque reference TC may be defined as:

$$TC = Kt0Ia, \quad (1)$$

where $TC$ is the constant torque reference, $Kt$ is the motor torque constant, 0 is the motor flux, $Ia$ is the motor armature current, and $TC$ depends upon the setting of potentiometer 140.

As the system speed increases above the FC/CEMF crossover, the reference signal produced by circuit 120 automatically becomes proportional to speed. This occurs, because as the motor field weakens after crossover, the constant torque current reference increases proportionally. When accelerating torque is necessary, the following relationship must be satisfied:

$$TA = JdW/dt, \quad (2)$$

where $TA$ is the accelerating torque required, $J$ is the moment of inertia of the motor and mechanical parts, $W$ is the speed and $t$ is time. The additional motor torque required then may be defined as:

$$TM = Kt0Ia \quad (3)$$

In this case, the current reference for proper compensation must follow the following relationship:

$$Ia = KpJdW/dt, \quad (4)$$

where $Kp$ is a constant and equal to $1/kt0$. The accelerating torque reference $TM$ then becomes:

$$TM = KpJdW/dt. \quad (5)$$

After the FC/CEMF crossover, the current reference must become proportional to the product of speed and the derivative of speed as expressed in Equation (6):

$$Ia = K'pWJDW/dt, \quad (6)$$

where $K'p$ is equal to $Kv/ktCEMF$. $KV$ is the motor voltage constant. The accelerating torque reference signal for compensation then may be expressed as follows:

$$TM = K'pW(JdW/dt). \quad (7)$$

Figure 2:
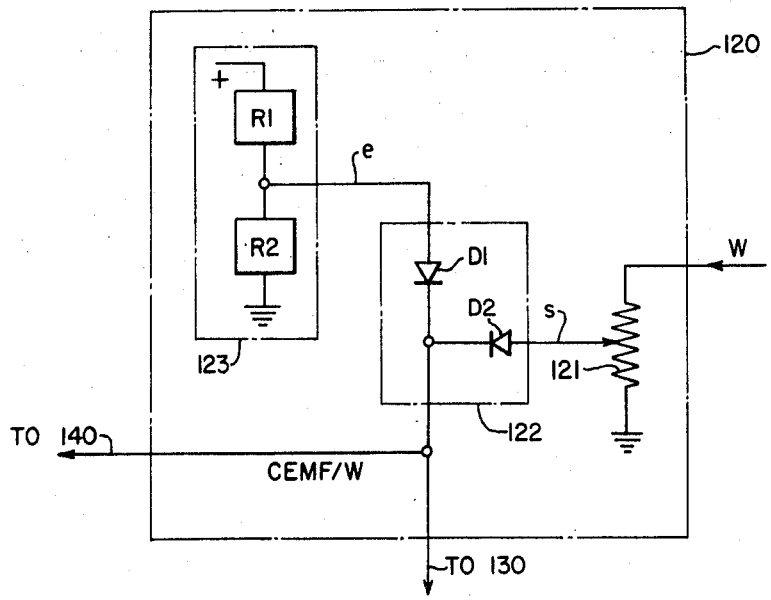
FIG. 2 shows Crossover Reference Circuit 120 of FIG. 1.

Reference is now made to FIG. 2 where circuit 120 is shown as including a reference signal circuit 123 producing a constant signal $e$ before the FC/CEMF crossover when system speed is below crossover value. A potentiometer 121 receives speed signal $W$ and produces a reference signal $s$ proportional to system speed. Signals $e$ and $s$ are applied to a comparator or crossover circuit 122 which is shown as including two diodes D1 and D2 receiving signals $e$ and $s$, respectively. The output signal produced by circuit 120 then corresponds to the crossover reference signal $E/W$ previously mentioned.

Figure 3:
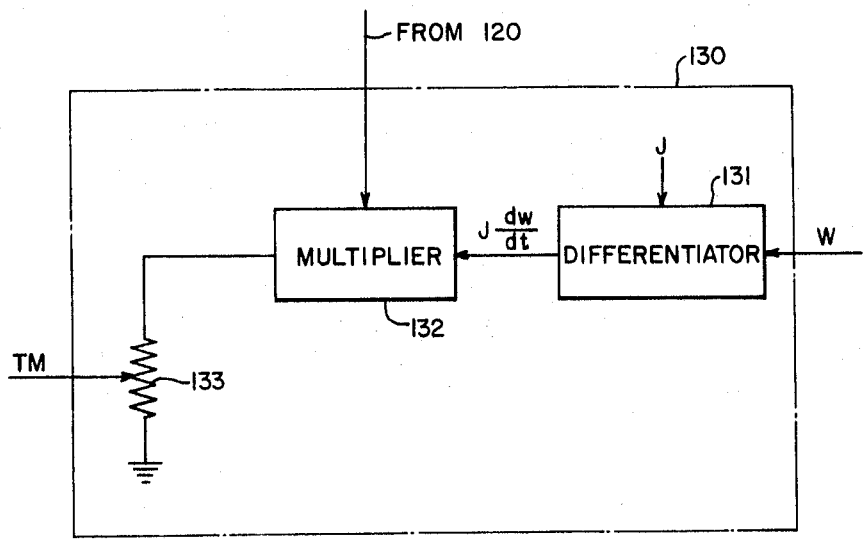
FIG. 3 shows Inertial Compensation Signal Generator 130 of FIG. 1.

The crossover reference signal is applied to signal generator 130 as shown in FIG. 3 and specifically to a multiplier 132 therein which also receives a signal representing $JdW/dt$ which is produced by a differentiator circuit 131 which receives speed reference signal $W$ and a reference $J$ and produces a signal representing $Jdw/dt$ required for compensation as set forth in Equation (2) above. The output of multiplier 132 is applied to a potentiometer 133 which provides the constants of proportionality previously mentioned so that signal $TM$ provided by generator 130 satisfies the requirements of Equations (4) and (6).

From the foregoing description, it should now be apparent that the present invention provides an effective means for adjusting armature current reference to provide the proper current control to maintain output torque constant during constant and weakening shunt fields and during system speed changes.

I claim as my invention:

1. In combination with a motor control system for a direct current motor with field weakening where the motor field current is kept constant in a first regulation state when the motor CEMF is below rated value and the CEMF is kept constant in a second regulation state as speed increases to rated value, a reference signal responsive to a speed signal for producing a first reference signal during said first regulation state and proportional to speed during said second regulation state; an inertial compensation generator responsive to said speed signal and to said first reference signal for producing an acceleration torque signal; means for translating said first reference signal to a constant torque signal; and means for combining said acceleration torque signal and said constant torque signal with a signal representing armature current to produce a current control signal for the system.

2. The combination of claim 1 wherein said inertial compensation generator comprises first means for differentiating said speed signal and second means for producing an acceleration torque reference signal proportional to the product of said first reference signal and the derivative of system speed.

3. The combination of claim 1 wherein said reference signal generator includes first and second circuits for producing a constant signal and a signal proportional to speed, respectively, and a crossover circuit responsive to these signals for producing said first reference signal.

4. The combination of claim 3 wherein said crossover circuit includes two diodes having first electrodes coupled to said first and second circuits, respectively, the second electrode of said diodes forming a junction to produce said first reference signal.

5. In combination with a direct current motor control system with field weakening wherein a current regulator maintains armature current proportional to a current reference signal and a field regulator establishes first regulation of motor field current when the motor CEMF is below rated value and second regulation for constant CEMF as motor speed increases to rated value, a first circuit for translating a system speed signal and a constant signal into a first reference signal during first regulation and proportional to speed during second regulation, means responsive to said first reference signal for producing constant torque and acceleration torque reference signals; and means for combining said constant torque and acceleration torque reference signals with said armature current signal to product a system current control signal.

6. The combination of claim 5 wherein said acceleration torque signal is produced as the function of the product of said first reference signal and the derivative of system speed.

7. The combination of claim 5 wherein said constant torque signal is produced as a linear function of said first reference signal.

8. The combination of claim 7 wherein said first circuit includes a diode comparator responsive to a constant signal and a signal proportional to speed and for producing a constant reference signal during first regulation and proportional to speed during second regulation.

9. The combination of claim 6 wherein said acceleration torque signal is defined by the relationship:

$$TM = KpJDW/dt$$

during first regulation and is proportional to $$TM = K'pW(JdW/dt)$$

during second regulation.

* * * * *